Nov. 17, 1970   J. F. LIDOSKI ETAL   3,541,374
MULTIPLE-UNIT DISPLAY APPARATUS PRODUCING RADIANT ENERGY
AT PHENOMENON OF DIELECTRIC TRAPPING
Filed July 16, 1968   3 Sheets-Sheet 1

INVENTORS
JOSEPH F. LIDOSKI
JAMES V. MASI
BY MAHONEY, MILLER & RAMBO
BY
ATTORNEYS

Nov. 17, 1970 J. F. LIDOSKI ETAL 3,541,374
MULTIPLE-UNIT DISPLAY APPARATUS PRODUCING RADIANT ENERGY
AT PHENOMENON OF DIELECTRIC TRAPPING
Filed July 16, 1968 3 Sheets-Sheet 2

INVENTORS
JOSEPH F. LIDOSKI
JAMES V. MASI
BY
MAHONEY, MILLER & RAMBO
BY
ATTORNEYS

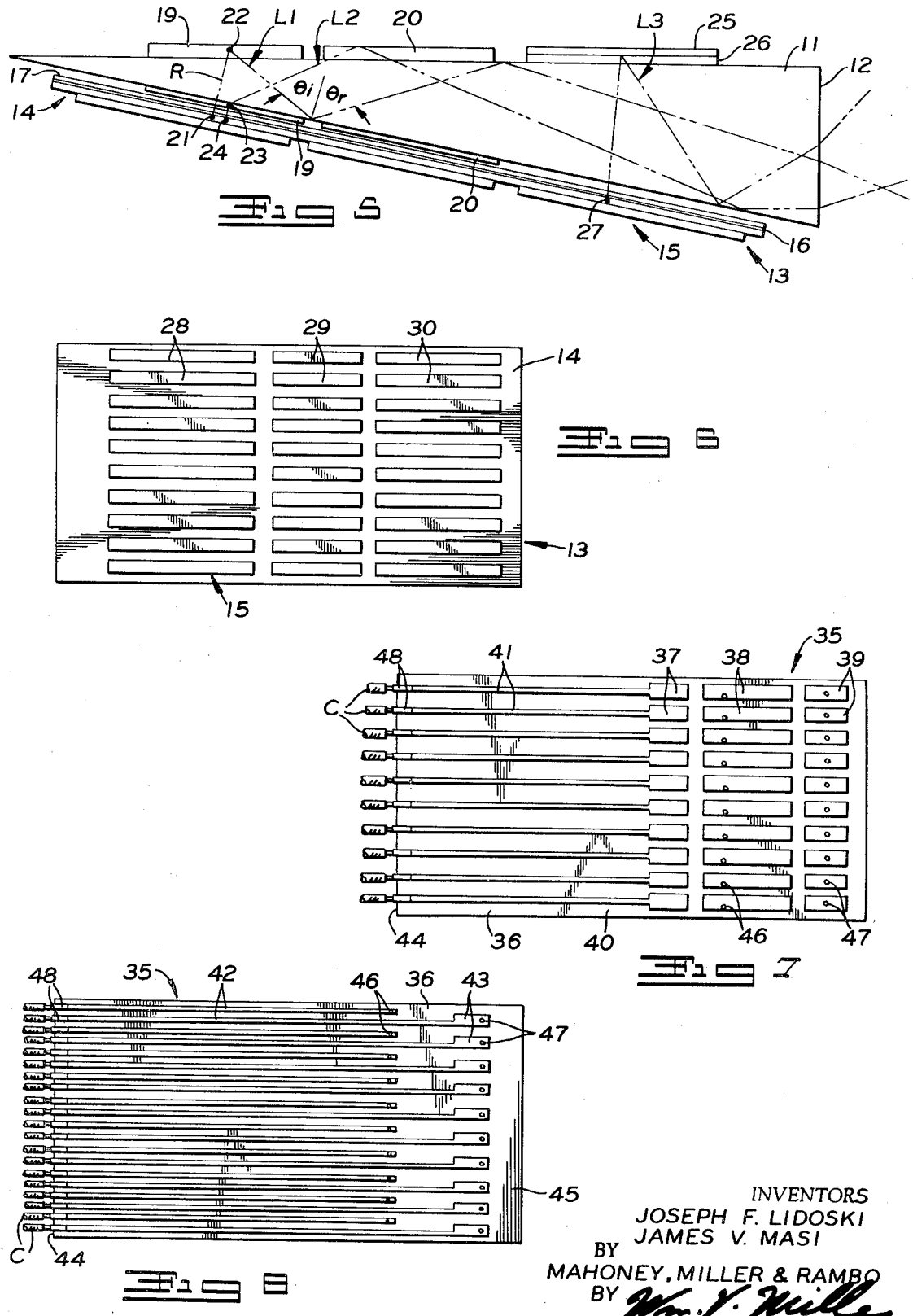

United States Patent Office 3,541,374
Patented Nov. 17, 1970

3,541,374
MULTIPLE-UNIT DISPLAY APPARATUS PRODUCING RADIANT ENERGY AT PHENOMENON OF DIELECTRIC TRAPPING
Joseph F. Lidoski, Floral Park, and James V. Masi, Huntington, N.Y., assignors, by mesne assignments, to Hartman Systems Co., Inc., Huntington Station, N.Y., a corporation of Ohio
Filed July 16, 1968, Ser. No. 745,195
Int. Cl. H05b 33/00
U.S. Cl. 313—108
15 Claims

ABSTRACT OF THE DISCLOSURE

A multiple-element display apparatus is formed from a plurality of elongated, solid-form conduits supported in assembled relationship with respective isotropic, radiant energy sources which induce radiation into the conduits for optical transmission throughout the volume of the conduit. By the subsequent action of dielectric reflection from the bounding conduit surfaces, a selective accumulation of luminous flux is favored along the longitudinal axis of the conduit. At a surface area representing the conduit termination, the accumulated flux is emitted at a flux density which can be substantially higher than that of the causative source. This phenomenon will be subsequently referred to as edge emission. The radiant energy sources stimulate emission from a distributed luminophor which is optically coupled to the conduit as a specular surface film or coating. The luminophor is responsive to excitation from incident energy generated by respective, independently controllable sources also supported in assembled relationship with the conduits. A polychromatic display is obtained by coating each conduit with multiple diverse luminophors having dissimilar radiation emission wavelengths. Selective excitation of the luminophors of each conduit, either singly or in combination, results in emission of radiation at the conduit termination with the radiation thus emitted having a specific chromatic characteristic.

GENERAL DISCUSSION OF ELECTROLUMINESCENT DISPLAYS

Radiant energy display apparatus, such as the well known electroluminescent lamps, are normally limited in output amplitude and wavelength of radiant energy due to constructional and physical limitations of such devices. An electroluminescent lamp utilized for display purposes in a common constructional form will comprise a layer of electroluminescent phosphor interposed between two planar electrodes. Application of an electric potential of suitable voltage and frequency across the electrodes will excite the intermediately disposed electroluminescent phosphor resulting in emission of radiant energy. By making at least one of the planar electrodes transmissive of the emitted radiant energy, a source of radiant energy is formed with the radiant energy being emitted as from the surface of this structure. The energy output of such a structure is dependent upon the applied electric potential and, in general, an increase in the applied electric potential will result in an increase in the radiant energy output. There is a practical limit as to the maximum output obtainable from a normal electroluminescent device due to the limiting voltage that may be applied without destructively affecting the electroluminescent sructure. In addition to destructive effects that may result from the application of relatively high electric potentials, the application of such high potentials will materially reduce the life expectancy of the electroluminescent structures. The emitted energy is also restricted to wavelengths in those bands associated with the activating phosphor-dopants or mixtures thereof. Other types of radiant energy sources are similarly restricted in output amplitude or wavelength.

GENERAL DESCRIPTION OF THIS INVENTION

The apparatus of this invention is designed to provide a higher intensity radiation output utilizing a radiant energy source such as an electroluminescent lamp without subjecting the radiant energy source to extremely high electric potentials with the consequent destructive effects. This increase in the output obtainable is attained through utilization of a secondary emitter which is responsive to the output emission from a primary emitter and incorporating edge-emission techniques to further increase the output. The apparatus of this invention is also designed to alter the wavelength distribution-characteristics of the output from that present in the energy of the primary emitter on a selectable basis. In its basic form, the apparatus of this invention comprises a primary radiant energy source which emits radiation and utilizes this radiation to excite a secondary emitter into emission. Radiant energy thus emitted by the secondary emitter is introduced into a conduit capable of optically transmitting the secondary radiation to an edge-emission surface. Utilizing a relatively large area for introducing the secondary radiation into the conduit and confining the radiation during transmission to a small edge surface for emission will result in a relatively high concentration of radiant energy at the point of emission. This secondary emitter is a radiation emitting luminophor having fluorescent characteristics and when optically transparent emits radiation in a substantially uniform or isotropic intensity pattern irrespective of the angle of observation. Secondary radiant energy will thus be internally reflected to a relatively large degree in a conduit of appropriate selected index of refraction compared to the surrounding medium and will produce the desired transmission characteristics for this device.

The enhancement of radiation output from the apparatus utilizing edge-emission techniques is not attainable without incorporation or utilization of a secondary emitter, such as an emitter having fluorescent characteristics. In the case of an electroluminescent radiation source, the radiation is emitted in a non-uniform intensity pattern characterized as lambertian, i.e., with flux density at a given angle proportional to the cosine of the angle from an axis erected normal to the plane of emission. The majority of radiation is thus emitted in a direction normal to the surface of an electroluminescent radiator. For this reason and because such a source is an optically diffuse surface, the phenomenon of internal reflection may not be directly used to intensify such radiation. The reason for this is that most of the radiation from such a source penetrating an adjacent conduit, such as is proposed in connection with this apparatus, and which is in optical contact with the electroluminescent radiator, will be at distributional angles closer to the normal than the critical angle necessary for internal reflection, and thus will transmit through the conduit's bounding surface. The small percentage of energy which lies at distributional angles further from the normal than the critical angle will be internally reflected, but not on a sustained basis, since these rays will again encounter the diffusely scattering plane of the electroluminescent phosphor, altering their reflection angles to lambertian form once again. This phenomena is familiarly observed as halation. If the adjacent conduit is not optically immersed on the electroluminescent source, the conduit cannot trap any incident light, since by Snell's basic law of refraction, a ray introduced from a low index media (air) outside the conduit will refract to an angle less than the critical angle, and always must exit from any surface parallel to the entrance surface at the same angle as the angle of entry.

Means whereby rays can be introduced through the surface of a conduit at angles greater than the critical angle, and thus facilitating trapping are provided by the use of fluorescent agents as described herein. With the secondary emitter comprising a luminophor formed as a transparent body, the stimulated emission is of an isotropic or equiangular distributional characteristic, quite different from normal diffusely emitting sources. Thus, in contrast to most normal sources, substantial fractions of the radiant energy will be subject to sustained dielectric reflection between bounding surfaces. Since these bounding surfaces are coextensive with the longitudinal axis of the conduit, such reflections will accumulate flux along the axis to the point of conduit termination, resulting in release of this flux at the termination surface. Internal reflection is optimized through selection of materials which maximize the difference in optical index of refraction at conduit interfaces and through appropriate configuring of the conduit surfaces. Several such luminophors may be placed on a single conduit to obtain a controllable variety of wavelengths in the conduit output spectrum. Intensity at the output surface is both a function of input source intensity and the amount of area allotted to the luminophor, thus permitting design means for obtaining balanced outputs of spectral variety from several luminophors at high intensity, regardless of variations in the efficiency of individual luminophors. Polychromatic outputs can be thus obtained from monochromatic inputs or sources of a single spectral type. Outputs are characterized by intense color saturation in consonance with the relatively sharp molecular resonance spectra of the luminophors.

These and other objects and advantages of this invention will be readily apparent from the following detailed description of an embodiment thereof and the accompanying drawings.

In the drawings:

FIG. 5 is a vertical sectional view on an enlarged scale taken along the longitudinal axis of a single, elemental radiation transmitting conduit of the apparatus and diagrammatically illustrating the internal reflection phenomenon.

FIG. 6 is a bottom plan view of a radiant energy source of the electroluminescent type taken along line 6—6 of FIG. 2.

FIG. 7 is a top plan view of the electrical contact-connector assembly taken along line 7—7 of FIG. 2.

FIG. 8 is a bottom plan view of the electrical contact-connector assembly taken along line 8—8 of FIG. 2.

Figure 1:
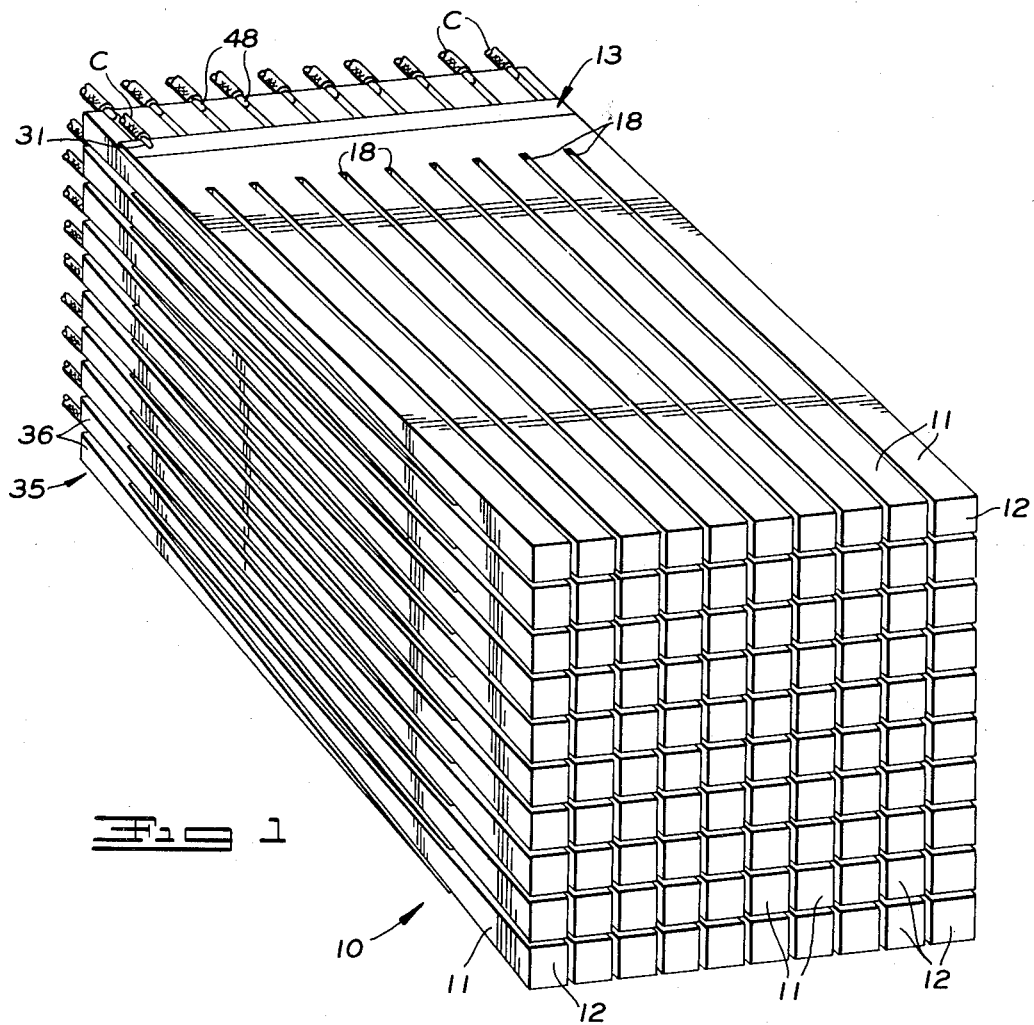
FIG. 1 is a diagrammatic perspective view of a multi-element, edge-emission display apparatus embodying this invention.

Referring to the drawings and in particular to FIG. 1, a multi-element display apparatus, designated generally by the numeral 10, embodying this invention is shown to illustrate a specific embodiment of the invention. This specific embodiment utilizes the edge emission phenomenon and comprises on hundred radiation transmitting conduits 11 assembled in a square cross section group with ten conduits in each of ten layers. Each radiation-transmitting conduit 11, as can be better seen by reference to FIGS. 2–5, is of a general prismatic shape being of triangular form in longitudinal section and rectangular in transverse section. The specific form of each conduit is chosen so that one end terminates in an end surface area 12 of square configuration and the resulting 100 terminating surface areas 12 are aligned in a single plane forming a composite viewing surface. Thus, selective inducement of radiant energy into one or more of the conduits results in formation of a desired image at the composite viewing surface.

Figure 2:
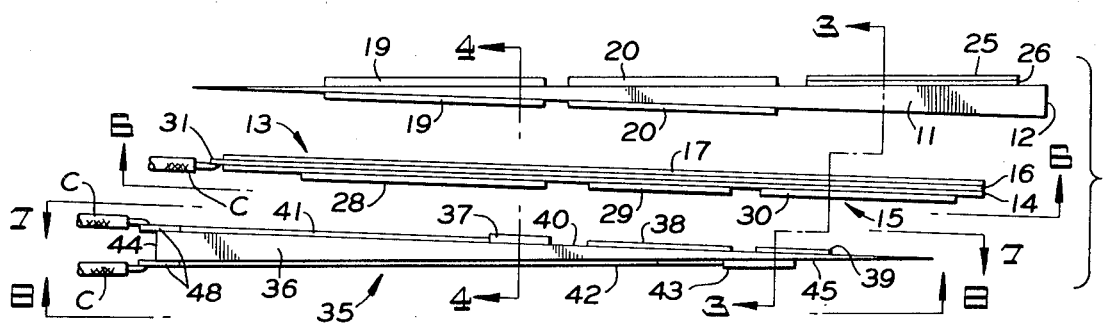
FIG. 2 is an exploded, side elevational view on an enlarged scale of a single elemental layer of the apparatus of FIG. 1.
Figure 3:
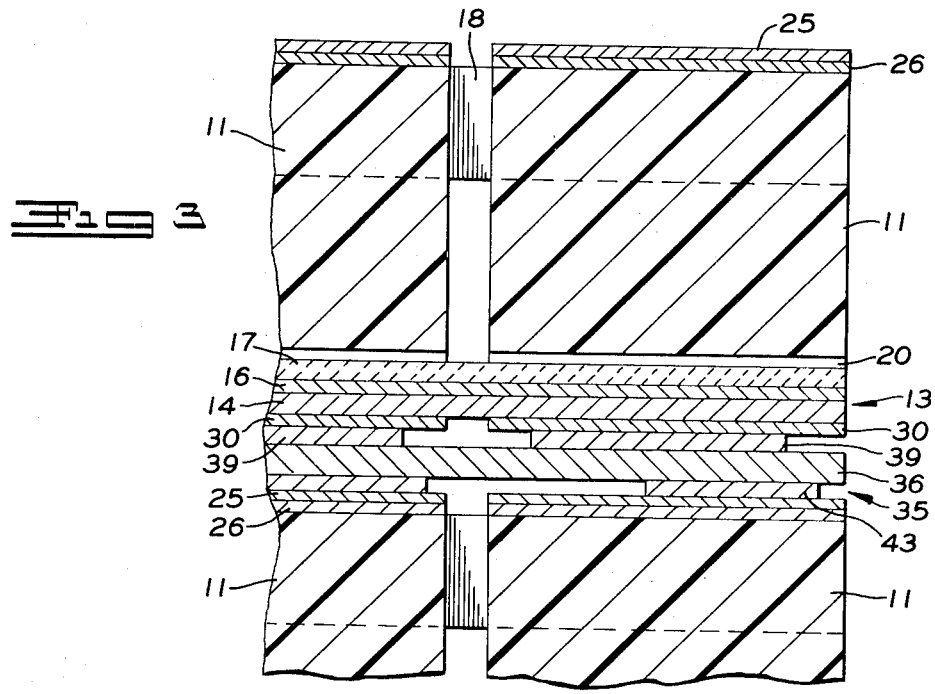
FIG. 3 is a fragmentary, vertical sectional view of the apparatus on an enlarged scale taken along line 3—3 of FIG. 2.
Figure 4:
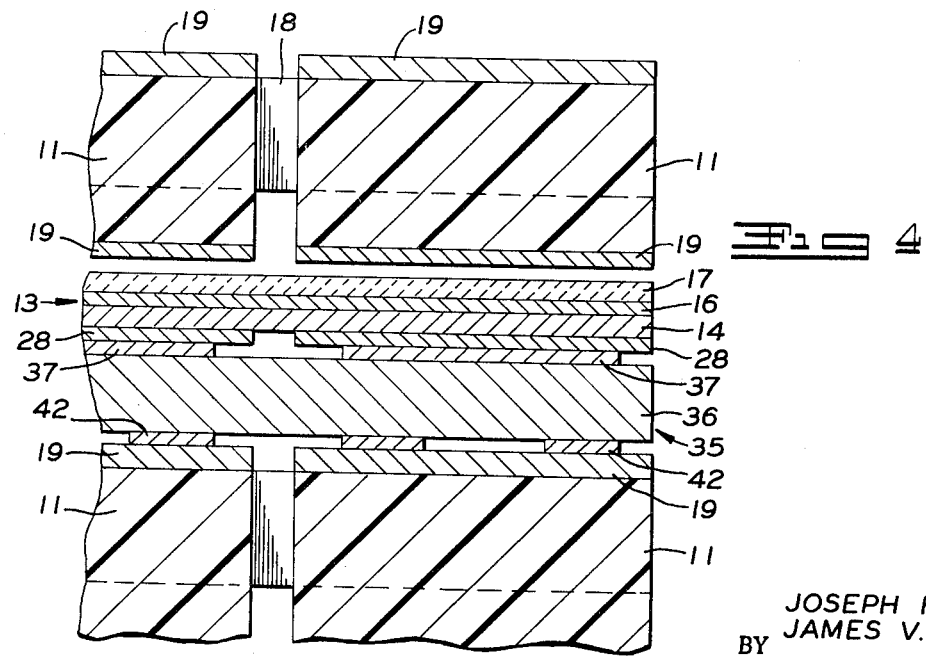
FIG. 4 is a fragmentary, vertical sectional view of the apparatus on an enlarged scale taken along line 4—4 of FIG. 2.

Selective inducement of radiant energy into the conduits to obtain the desired dielectric reflection is accomplished by a primary radiant energy source, designated generally by the numeral 13, as best seen in FIG. 2, and a secondary radiation emitting luminophor which is selectively excited by the primary radiation. In this embodiment of the invention, the primary radiant energy source 13 comprises an electroluminescent device embodying well known, basic constructional techniques in a planar configuration and includes a layer of phosphor material 14 interposed between two planar electrode arrays 15 and 16. A suitable electric power source (not shown) of appropriate potential and frequency is connected across the electrode arrays 15 and 16 to excite the phosphor material 14 and cause emission of radiant energy. The electrode array 16 is formed from a material which, in a relatively thin layer, will be transmissive of the radiant energy emitted by the phosphor material 14. Energy thus produced will appear to be emitted from the planar surface of this electrode. The radiation transmitting electrode array 16 may be formed from a relatively thin layer of tin oxide that may be formed on a thin sheet glass substrate 17 having a thickness of the order of 0.006 inch. The phosphor material may comprise any of the well known phosphors utilized in construction of electroluminescent devices along with the necessary amounts of a suitable activator with the specific materials determined on the basis of the energy emission characteristics desired. In this embodiment of the apparatus, the phosphor selected was U.S. Radium blue phosphor #3898B which was loaded into a cyanoethyl sucrose and cellulose binder and emitted primary radiation characteristically in the visible blue spectrum. This phosphor mix may be deposited by spraying onto the transparent tin oxide 16 on the glass substrate 17 for structural integrity of the unit. Loss of radiation from the radiant energy source 13 may be minimized by forming the electrode array 15 from a material which will be substantially opaque and reflective and thus prevent total loss of back-directed radiation. Copper or preferably aluminum may be utilized in the fabrication of the opaque electrode array 15 and these materials may be formed in a relatively thick layer to enhance the structural integrity of the unit.

Each radiation transmitting conduit 11 is fabricated from a suitable material capable of transmitting radiation of the wavelengths for which the display apparatus is designed. The present embodiment of the apparatus is designed to provide a visual display and the conduit materials are selected for capability of optically transmitting radiation of wavelengths within the entire visible spectrum. Preferably, material selection is also based on optical transmission efficiency as well as structural characteristics to provide an optimum display apparatus. In the present visual display apparatus, the conduits were fabricated from clear methylmethacrylate which was formed in tapered sheets of sufficient width to include the ten conduits 11 which are included in a single layer of the display. Each sheet was cut longitudinally by a saw to form the individual conduits with the saw kerf terminating a short distance from the narrow end thereby leaving an interconnecting tab 18 between adjacent conduits for structural rigidity of the conduit subassemblies. Although the surfaces of each tapered sheet were polished and made specular to enhance internal reflection, the interfaces of adjacent conduits resulting from the slitting operation were not polished. As an example of the physical size of the display apparatus constructed, each conduit measured 0.100 inch on the vertical and horizontal sides at the radiation exit face or end surface areas 12 and were 2.25 inches in length which demonstrates the capability for miniaturization of a display apparatus of this invention.

In accordance with this invention, the secondary radiation emitting luminophor is formed as a coating or film on at least one surface of the conduits 11. The luminophor forming materials are selected to be compatible with the primary radiant energy source 13 and comprise well known fluorescent materials which emit secondary radiation of a characteristic wavelength when excited by the primary radiation emitted by the source 13. This display apparatus is polychromatic in that it is designed to emit monochromatic radiation of diverse wavelengths and the luminophor or fluorescent materials are formed into two discrete elements of dissimilar materials on at least one surface of each conduit. Referring to FIG. 2, these discrete fluorescent elements, two in this embodiment, are seen formed as films 19 and 20 on opposed surfaces of a conduit 11 with one of these surfaces juxtaposed to the primary radiation source 13 in the assembled display apparatus. The fluorescent film 19 is selected to emit radiation having characteristic wavelengths in the visible red spectrum while the film 20 emits radiation having characteristic wavelengths in the visible green spectrum. Since the primary radiation source 13 is selected to emit radiation having characteristic wavelengths in the visible blue spectrum, each of the fluorescent films 19 and 20 will be excited to emit secondary radiation of the respective wavelengths as the visible red and green spectrum wavelengths are relatively longer than the wavelengths of the blue spectrum. This is in accordance with the principles of Stokes' law of fluorescence. The fluorescent materials are also selected on the basis of having a relatively high capability of transmitting the secondary radiation which enhances the efficiency of operation through avoidance of self-absorption. Also, the luminophor must be capable of transmitting incident primary radiation that is not absorbed in exciting the luminophor into emission of secondary radiation.

The luminophor is formed on the conduit in optical contact with a surface thereof such as by coating this surface with the appropriate fluorescent dye in a suitable transparent vehicle. In this embodiment, the luminophor is placed in bands of predetermined width extending across the surfaces of the conduits 11 forming a layer of the assembled apparatus with the relative longitudinal length of each determined by the excitation response characteristic to the primary radiation for obtaining a uniform secondary radiation emission. While the two luminophor film elements 19 and 20 are shown in FIGS. 2 and 5 as being of substantially equal length, the necessary length for each type of luminophor will be determined for a particular device with consideration given to the specific luminophor selected and the electroluminescent phosphor selected for the primary radiation source.

In addition to the foregoing selection criteria, the luminophor selection must also consider the relative optical index of refraction of the luminophor and the conduit. Preferably, the luminophor and conduit materials are selected to have substantially equal indices of refraction for optimum performance. Although selection on this basis is preferred, the index of refraction of the luminophor may be somewhat less than that of the conduit without detracting from the performance in inducing internal reflection within the conduit. If the luminophor is of a higher index than the conduit, some radiant energy will be trapped within the luminophor.

Substantial internal reflection of radiant energy within the conduits 11 requires that the conduits and the luminophor or fluorescent film elements 19 and 20 have an index of refraction which is greater than the index of refraction of a medium adjoining the exposed surfaces of each. The medium next adjoining the surfaces of the conduits 11 and the fluorescent elements 19 and 20 may be air having an index of refraction of 1.00 and thus comply with the requirements for producing internal reflection or it may be a suitable low index glass or plastic of some higher value index which is still less than the index of the conduit and luminophor. The complete mechanical structure for supporting the several elements of the display apparatus in the desired relationship is not illustrated in FIG. 1, as this structure does not form a part of this invention and such structures are well known to those skilled in this particular art. It will suffice to say that this mechanical structure would provide the ncessary mechanical support to maintain the spacing between the juxtaposed surfaces of the conduits 11 and fluorescent film elements 19 and 20 and the adjacent primary energy source 13. In practice, it has been found that these surfaces may be brought into intimate mechanical contact so as to provide the compact assembly of FIG. 1 without inducing a significant degree of optical contact, and thus unified and rigid mechanical structures are easily realized.

The phenomenon of internal reflection within a radiation transmitting conduit 11 is graphically illustrated in FIG. 5. An elemental particle 21 of the electroluminescent phosphor material 14 is shown as being excited into emitting a ray of energy R which is substantially normal to the emitting surface of the electroluminescent lamp or primary radiation source 13 and traverses the adjacent luminophor element 19 and the conduit 11 to the opposed luminophor element 19. This energy thus transmitted will be absorbed by an elemental particle 22 of the luminophor element 19 causing this particle to fluoresce and emit the secondary radiation which will be of a substantially longer wavelength than the exciting radiation. Radiation thus emitted by the luminophor particle 22 may follow the path designated L1 in FIG. 5. Assuming that the index of refraction of the luminophor element 19 is equal to the index of refraction of the conduit 11, it will be seen that this ray L1 will traverse the interface of the luminophor and conduit without refraction. After passing this interface, the ray of energy L1 will traverse the conduit 11 to the opposite surface of the conduit and, having traversed the conduit 11, will be incident to this surface at an angle $\theta_i$ relative to a normal to this surface. If the angle of incidence $\theta_i$ exceeds or is equal to a critical angle $\theta_c$, ray L1 will be totally internally reflected within the conduit 11 and will be reflected from the interface surface by the angle $\theta_r$ which is equal to the angle $\theta_i$. This critical angle $\theta_c$ determining the total internal reflection of an incident ray is given by the equation $$\theta_c = \sin^{-1} \frac{N_2}{N_1}$$

It can be seen from this equation that the critical angle resulting in internal reflection is dependent on the relative indexes of refraction $N_1$ and $N_2$ of the conduit 11 and of the adjoining medium which, in this instance, comprises an air space. In the case where the conduit 11 is fabricated from either a plastic or glass material having an average index of refraction of 1.50, it will be seen that this critical angle will be of the order of 42° to result in total internal reflection of ray of energy. The ray of energy L1 thus totally internally reflected within the conduit 11 will again traverse the conduit as well as progress longitudinally through the conduit until reaching the opposite surface where it will again be internally reflected. Continuing, the ray L1 will exit the conduit 11 at the terminating end surface or exit face 12 as the angle of incidence to this surface, which is substantially orthogonal to the longitudinal axis of the conduit, will be less than the critical angle of $\theta_c$.

A second ray L2 is also shown to further illustrate internal reflection within the conduit 11. This ray is assumed to emanate from an elemental luminophor particle 23 in the luminophor element 19 adjacent the primary radiation source 13 and which particle was excited by incident primary radiation emitted by an electroluminescent particle 24. Ray L2 also progresses longitudinally through the conduit 11 as a consequence of internal reflection and subsequently exits at the surface 12 in a manner similar to that described with respect to ray L1. However, it will be noted that ray L2 is shown traversing the conduit at such an angle that it is incident to the opposite surface which is coextensive with the luminophor element 20. Ray L2 traverses this interface and will be internally reflected at the outer surface of the luminophor element assuming that the angle of incidence and index of refraction relationships are as previously considered with respect to ray L1. The luminophor element 20 does not respond to the incident ray L2 and emit secondary radiation since the radiation wavelength of ray L1 is greater than the wavelength of the radiation emitting luminophor element 20 and is thus ineffective as excitation radiation. However, the luminophor element 20 will be responsive to excitation radiant energy received from the primary radiation source 13 and produce secondary radiation of a characteristic wavelength. Secondary radiation emission from the luminophor element 20 will be subjected to internal reflection in the same manner as secondary radiation from the luminophor element 19. Also, primary radiation emitted from the source 13 in the region coextensive with the luminophor element 19 will not be effective in exciting the luminophor element 20 due to the longitudinal spacing and the lambertian emission characteristic of an electroluminescent lamp.

Several basic corrollaries of Snell's law of refraction may be restated to help in an understanding of these various phenomena as employed in the illustrated embodiment. These are:

(1) Any ray originating in a lower index media may traverse into a higher index media.

(2) A ray in a high index media may always retraverse to a lower index media, if it originated in that lower index media.

(3) Critical angles exist only in traversing from higher to lower index media.

(4) The critical ray angle for a high index media with air, when traced through its refractions in lower index media, will also be refracted to the critical angle of the lower index media with air: ergo, the critical ray is an identity for all lower index media.

Radiant energy emitted from the luminophor elements 19 and 20, as previously indicated, will be emitted in a substantially isotropic pattern of intensity. Thus, radiation will be emitted at all angles into the conduits 11. Some of this radiation will not be internally reflected and will be ineffective in producing edge emission as such radiation will be transmitted outside of the conduits 11. All other radiation emitted by the luminophor which will exceed the angle of incidence $\theta_c$ will be internally reflected until subsequently encountering a non-parallel plane at an angle less than $\theta_c$, such as an orthogonal edge surface. Since the emitting surfaces of the luminophor elements 19 and 20 may be increased within the practical limits to a relatively large degree by increasing the dimension of depth behind the emitting edge as compared to the thickness of the conduit 11, it will be seen that the intensity of the emission will be greatly increased over that from directly viewing the emitting surface of the luminophor, by virtue of the increasing amount of trapped rays.

The display apparatus for providing polychromatic secondary radiation has now been described in detail as providing radiation having a characteristic wavelength in either the visible red or green spectrum. Either wavelength radiation may be obtained through selective excitation of the portion of the electroluminescent phosphor 14 which is coextensive with the respective luminophor elements 19 or 20. If desired, a composite color may be obtained through simultaneous excitation of both coextensive portions of the phosphor 14 which will provide a visual stimulus related to an effective composite wavelength. Thus, a basic three-color display may be obtained from two luminophor elements.

Extension of the visible color spectrum is attained in accordance with the present invention through utilization of the primary radiation from the source 13. This primary radiation is of wavelengths in the visible blue spectrum and which, when combined simultaneously with the red and green radiation, will provide a resultant composite radiation spectrum that is effectively white. In addition to white, combination singly with either the red or the green spectrum will provide composite radiation having effective characteristic wavelengths of two additional visible color spectrums. Thus, utilization of the primary radiation will provide a basic polychromatic display of six colors in addition to white.

Because of the lambertian radiation emission characteristic of a primary radiation source which comprises an electroluminescent lamp, such a primary radiation source may not be utilized directly in producing the desired edge emission although it is effective in exciting the secondary radiation emitting luminophors. Edge emission of the primary radiation is effected through utilization of a diffuse white reflector 25 juxtaposed to and coextensive with a portion of the conduit surface with the reflector being disposed at the end of the conduit nearest the edge emission surface 12. Interposed between the conduit 11 and the reflector is a thin film 26 formed from a material selected to be optically transmissive of the primary radiation and having an optical index of refraction which is less than that of the conduit. The film 26 is in optical contact with the conduit 11 and the reflector 25 and thus maintains the index of refraction criteria necessary for obtaining internal reflection. A ray of radiation L3, emitted from an elemental particle 27 of the electroluminescent phosphor 14 is shown in FIG. 5 as traversing the conduit 11 and film 26 and incident on the reflector 25. This ray L3 is shown slightly refracted when traversing the interface between the conduit 11 and film 26 due to the difference in refractive index and the ray is not normal to this interface at the point of incidence. At the interface of the reflector 25, the incident ray will be diffusely reflected and may take the illustrated path and exit the conduit 11 at the surface 12 after internal reflection at the opposite surface of the conduit, due to the simulated isotropic radiation emitting characteristic of a diffuse reflector. Thus, a portion of the primary radiation emitted by the electroluminescent phosphor 14 will be subjected to internal reflection and subsequent edge emission. It will be noted that radiant energy transmitted internally of the conduit and incident to the interface with the film 26 will be internally reflected due to the difference in refraction index.

Selective excitation of desired portions of the electroluminescent phosphor layer 14 of the primary radiation source 13 is effected through fabrication of the electrode array 15 as a multiplicity of electrically discrete electrode elements. These electrode elements as best seen in FIG. 6 comprise rectangularly shaped areas designated 28, 29 and 30 which are longitudinally aligned to be substantially coextensive with respective luminophor elements 19 and 20 or diffuse reflector 25 formed on a respective conduit 11. This longitudinal arrangement of three electrode elements is repeated for each of the other nine conduits which will be served by a particular primary radiation source.

The electrode array 16 forms a ground plane for this electroluminescent lamp structure and is provided with a terminal connection 31 for external connection with the electrical power source.

In assembling the display apparatus shown in FIG. 1, ten of the primary radiation sources 13 are juxtaposed to respective ones of ten conduit structures to thus form a display module comprising one hundred conduits with associated edge emission surfaces 12 forming a composite viewing face. While the radiation sources are supported in juxtaposition to a surface of the conduits 11 and luminophor films 19 and 20, the glass substrate 17 is not in optical contact with a surface of either the luminophor elements 19 and 20 or the conduits and thus preserves the optical index of refraction relationship necessary for internal reflection and resultant edge emission of radiation. In practice, it has been found that these surfaces may be brought into intimate mechanical contact without inducing a significant degree of optical contact and unified and rigid mechanical structures may be readily attained.

In the construction of a primary radiation source 13 such as an electroluminescent lamp, the electrodes 28, 29 and 30 are formed by deposition or coating of a relatively thin film of electrically conductive material such as aluminum onto a surface of the electroluminescent phosphor 14. These relatively thin electrodes thus present a problem in obtaining a suitable electrical connection between the electrodes and an associated electric circuit which controls the application of a potential to the electroluminescent lamp. Not only are the thin-film electrodes incapable of providing the necessary structural integrity in a practical electrical device but it is difficult to physically achieve a suitable mechanical connection for electrical continuity. The problem of making the necessary electrical connections to the specific electrodes is further compounded by the generally small size and configuration of visual display devices of the electroluminescent type. In this particular illustration, the visual display device may present a viewing area of the order of one square inch and, with one hundred radiation-transmitting conduits 11 each having a requirement for three distinct electrical connections, results in the necessity of connecting three hundred electrical conductors to these electrodes in addition to the connections to the ten transparent common ground electrode arrays 16.

In accordance with this invention, the problem of making the numerous electrical connections in a relatively small space is effectively solved through the utilization of contact connector assemblies 35 which may be readily assembled with the radiation-transmitting conduits 11 and electroluminescent lamps 13 into a visual display device. Specific constructional details of a contact connector assembly 35 may be best seen by reference to FIGS. 2, 7 and 8 of the drawings. Each contact connector assembly is designed to provide an electrically discrete connection to each of the electrodes 28, 29 and 30 of an electroluminescent lamp 13 which is associated with a specific layer of radiation transmitting conduits 11. In this specific embodiment of the invention, each contact connector assembly 35, which is coextensive with a respective one of the electroluminescent lamps 13, comprises a dielectric substrate 36 and a plurality of discrete electrical contacts 37, 38 and 39. These electrical contacts 37, 38 and 39 are disposed on a planar surface 40 of the dielectric substrate 36 in three linearly arranged groups of ten electrodes each with the specific arrangement and size of the electrical contacts being such as to result in coincidence of each contact with a respective electrode 28, 29 or 30 of the electroluminescent lamp 13. With the electrical contacts 37, 38 and 39 thus arranged on the dielectric substrate 36, juxaposition of a contact connector assembly 35 to an electroluminescent lamp 13 with the surface 40 adjacent the electrode array 15 will result in formation of the desired electrical-mechanical engagement of the electrodes 28, 29 and 30 with the respective contacts. A silver epoxy compound may be interposed between coextensive contact areas for improved contact.

The electrode contacts 37, 38 and 39, which are formed of electrically conductive material, may be formed on the dielectric substrate 36 by printed circuit techniques or by other suitable methods. Irrespective of the particular technique or method utilized, each contact is formed as a thin plate with a surface area which will be adequate to transmit electrical power for the particular electrical device and may not be coextensive with the entire electrode with which it is associated. The substrate 36 is also of triangular configuration in longitudinal section to complement the triangular configuration of the radiation-transmitting conduit structures and thus forms a composite rectangular shape when assembled into a display device. Utilization of this triangular configuration permits a substantial reduction in the overall size of the display device over that of a rectangular configuration without a material reduction in the structural strength of the assembled display device while maintaining a maximum viewing area. Also, it will be noted that while the layers of light-transmitting conduits 11 and the respective contact connector assemblies are interleaved when assembled, they are not fully overlapped to permit assembly with the electroluminescent lamp structure 30 without resulting in a detracting space between the layers of surface areas 12 which form the viewing surface. In the illustrated display device, the dielectric substrate 36 is formed from a material which is structurally rigid as are the light-transmitting conduits 11.

Although not shown, a completely assembled visual display device as shown in FIG. 1 would be maintained in this assembled relationship through utilization of appropriate framing or supporting structures which provide the necessary structural integrity for the unit as well as protection for the components of the device. This may be accomplished through well known encapsulation processes or mechanical structures and, therefore, is not illustrated in the drawings.

Connection of an external electric circuit to the respective electrical contacts 37, 38 and 39 is conveniently accomplished by providing electrical conductors or buss bars 41, 42 and 43 which project along a surface of the dielectric substrate 36 toward an end edge 44 of the substrate. A group of such conductors 41 are formed on the surface 40 of the substrate and connect with the electrodes 37. Groups of conductors 42 and 43 which are designed to connect with the respective contacts 38 and 39 are arranged on an opposite surface 45 of the substrate and also project toward the end 44 of the substrate. Printed circuit techniques may also be utilized in the formation of the conductors 41, 42 and 43. With such techniques the conductors may be readily formed as thin films of electrically conducting materials on the surfaces 40 and 45 of the substrate 36. Since the electrical conductors 42 and 43 are formed on the surface 45 opposite the surface 40 on which the electrical contacts 38 and 39 are formed, it is necessary that an electrical interconnection be provided. This interconnection is formed by electrically conductive elements 46 and 47 that extend through apertures formed in the substrate 36 and are electrically bonded to the respective contacts and conductors.

Each of the contact connector assemblies 35 of this embodiment of the invention are also provided with suitable terminal connections 48 for facilitating connection with each of the electrical conductors 41, 42 and 43. These terminal connections 48 may be formed by structurally rigid pins which may be at least partially embedded in the substrate for mechanical integrity of the unit and to which external electric conductors C may be readily connected to the contact connector assembly 20 by means of the terminal connections 48. Some terminal connections 48 and conductors C have been omitted from FIGS. 7 and 8 to simplify illustration.

It will be readily apparent from the foregoing detailed description of an embodiment of this invention that a novel display apparatus is provided which is capable of polychromatic output on a selectable basis. A desired image may be readily formed at a viewing face of a compact module comprising a multiplicity of relatively small elemental viewing surface areas resulting in formation of images with a relatively high degree of resolution providing smooth image contiguity as to both line resolution and color. While a power source for excitation of the primary radiation source has not been disclosed in detail, it will be apparent that a suitable power source would incorporate necessary switching circuits for selective energization of the appropriate electrical contacts to effect a desired image in accordance with a particular input signal. Since this circuitry does not form a part of this invention to indicate that a suitable electrical potential would be applied to selected electrodes by means of the illustrated terminal connections. The prismatic radiation-conducting conduit configuration in cooperation with illustrated electroluminescent lamp structure and the contact connector assemblies permits formation of a compact display apparatus through utilization of the edge emission phenomenon. Although a one hundred element display apparatus has been illustrated, it will be understood that number of elements and relative physical arrangement may be varied in accordance with specific display requirements.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A multiple-unit display apparatus comprising
   (A) a plurality of elongated solid-form conduits for transmitting radiant energy within a first wavelength spectrum with each conduit having a longitudinal axis and opposed longitudinally extending surfaces forming internally reflecting surfaces with one of said surfaces adapted to transmit radiant energy into said conduit and terminating at one end in an edge emission surface disposed transversely to said longitudinal axis, said plurality of conduits supported in assembled relationship with the edge emission surfaces forming a composite display surface,
   (B) a radiant-energy source for selectively emitting primary radiation having a characteristic lambertian energy-emission distribution of a wavelength within a second wavelength spectrum, and
   (C) secondary radiation means responding to incident primary radiant energy for producing secondary radiant energy having a characteristic isotropic energy distribution, said secondary radiation means including a plurality of dissimilar luminophors which fluoresce in response to incident primary radiation to emit radiant energy in respective relatively different wavelength spectrums within a third wavelength spectrum which is within said first wavelength spectrum with said luminophors disposed in spaced, longitudinally aligned and optically contacting relationship to said conduits for inducing said secondary radiant energy into said conduits at said one longitudinal reflecting surface adapted to transmit radiant energy.

2. A multiple-unit display apparatus according to claim 1 wherein said conduits are formed from a material having an optical index of refraction $N_1$ and are disposed with said reflecting surfaces adjacent surrounding media having an optical index of refraction $N_2$ which is less than $N_1$ for internally reflecting radiant energy incident to one of said reflecting surfaces at an angle $\theta_c$ determined by the relationship $$\frac{N_2}{N_1} = \sin^{-1}\theta_c$$

3. A multiple-unit display apparatus according to claim 2 wherein said luminophor is formed as a film on said one longitudinal reflecting surface of said conduits and has an optical index of refraction which is not greater than $N_1$.

4. A multiple-unit display apparatus according to claim 3 wherein said luminophor is formed on both of said longitudinal reflecting surfaces of said conduits.

5. A multiple-unit display apparatus according to claim 1 wherein said luminophor materials emitting energy of relatively longer wavelength are disposed most remote to said edge emission surface.

6. A multiple-unit display apparatus according to claim 4 wherein said first wavelength spectrum is inclusive of said second wavelength spectrum and said primary radiation source is juxtaposed to one of said reflecting surfaces with said primary radiation being transmittable through the adjacent luminophor film.

7. A multiple-unit display apparatus comprising
   (A) a plurality of elongated solid-form conduits for transmitting radiant energy within a first wavelength spectrum with each conduit having a longitudinal axis and opposed longitudinally extending surfaces forming internally reflecting surfaces with one of said surfaces adapted to transmit radiant energy into said conduit and terminating at one end in an edge emission surface disposed transversely to said longitudinal axis, said plurality of conduits supported in assembled relationship with the edge emission surfaces forming a composite display surface,
   (B) a radiant-energy source for selectively emitting primary radiation having a characteristic lambertian energy-emission distribution of a wavelength within a second wavelength spectrum,
   (C) secondary radiation means responding to incident primary radiant energy for producing secondary radiant energy having a characteristic isotropic energy distribution, said secondary radiation means being disposed in optically contacting relationship to said conduits for inducing said secondary radiant energy into said conduits at said one longitudinal reflecting surface adapted to transmit radiant energy, and
   (D) a diffuse reflecting surface disposed adjacent one of said internally reflecting surfaces of said conduits and a layer of radiant energy transmitting material interposed between said conduits and said difuse reflecting surface, said primary radiation source being disposed adjacent said opposite reflecting surface.

8. A multiple-unit display apparatus comprising
   (A) a plurality of elongated solid-form conduits for transmitting radiant energy within a first wavelength spectrum with each conduit having a longitudinal axis and opposed longitudinally extending surfaces forming internally reflecting surfaces with one of said surfaces adapted to transmit radiant energy into said conduit and terminating at one end in an edge emission surface disposed transversely to said longitudinal axis, said opposed longitudinally extending surfaces being relatively divergent toward said edge emission surface, said plurality of conduits supported in assembled relationship with the edge emission surfaces forming a composite display surface,
   (B) a radiant-energy source for selectively emitting primary radiation having a characteristic lambertian energy-emission distribution of a wavelength within a second wavelength spectrum, and
   (C) secondary radiation means responding to incident primary radiant energy for producing secondary radiant energy having a characteristic isotropic energy distribution, said secondary radiation means being disposed in optically contacting relationship to said conduits for inducing said secondary radiant energy into said conduits at said one longitudinal reflecting surface adapted to transmit radiant energy.

9. A multiple-unit display apparatus according to claim 8 wherein said edge emission surface is orthogonally disposed to one of said opposed surfaces.

10. A multiple-unit display apparatus according to claim 9 wherein said radiant-energy source is juxtaposed to the other of said opposed surfaces.

11. A multiple-unit display apparatus according to claim 8 which includes at least one planar array of a plurality of said conduits assembled with respective ones of said opposed surfaces and said edge emission surfaces disposed in coplanar relationship.

12. A multiple-unit display apparatus according to claim 11 which includes a plurality of said planar arrays assembled with all of said edge emission surfaces disposed in coplanar relationship to form a composite display surface.

13. A multiple-unit display apparatus according to claim 1 wherein said radiant-energy source comprises an electroluminescent phosphor disposed between two electrode arrays, said electrode arrays connected to selectively receive electric power from an electric power source and form an electric field therebetween for excitation of said phosphor.

14. A multiple-unit display apparatus comprising
(A) a plurality of elongated solid-form conduits for transmitting radiant energy within a first wavelength spectrum with each conduit having a longitudinal axis and opposed longitudinally extending surfaces forming internally reflecting surfaces with one of said surfaces adapted to transmit radiant energy into said conduit and terminating at one end in an edge emission surface disposed transversely to said longitudinal axis, said plurality of conduits supported in assembled relationship with the edge emission surfaces forming a composite display surface,
(B) a radiant-energy source for selectively emitting primary radiation having a characteristic lambertian energy-emission distribution of a wavelength within a second wavelength spectrum, and
(C) secondary radiation means responding to incident primary radiant energy for producing secondary radiant energy having a characteristic isotropic energy distribution, said secondary radiation means being disposed in optically contacting relationship to said conduits for inducing said secondary radiant energy into said conduits at said one longitudinal reflecting surface adapted to transmit radiant energy, and said secondary radiation means including a plurality of dissimilar luminophor elements which fluoresce in response to incident primary radiation to emit radiant energy of respective, characteristic wavelengths within a third wavelength spectrum which is within said first wavelength spectrum, each of said dissimilar luminophor elements being formed on at least one of said opposed surfaces of said conduits in spaced, longitudinally aligned relationship.

15. A multiple-unit display apparatus according to claim 14 wherein said radiant energy source comprises an electroluminescent phosphor disposed between two electrode arrays and assembled in superposed relationship to one of said opposed surfaces of said conduit, one of said electrode arrays including a plurality of electrically discrete electrode elements with each electrode element superposed to a respective luminophor element, with said electrode arrays connected to receive electric power from an electric power source to form a phosphor-exciting electric field therebetween with respect to selected electrode elements in said one electrode array.

References Cited

UNITED STATES PATENTS

| | | | |
|---|---|---|---|
| 2,975,318 | 3/1961 | Nicoll | 313—108 |
| 3,141,106 | 7/1964 | Kapany | 313—92 |

RAYMOND F. HOSSFELD, Examiner

U.S. Cl. X.R.

350—96